United States Patent Office 3,281,115
Patented Oct. 25, 1966

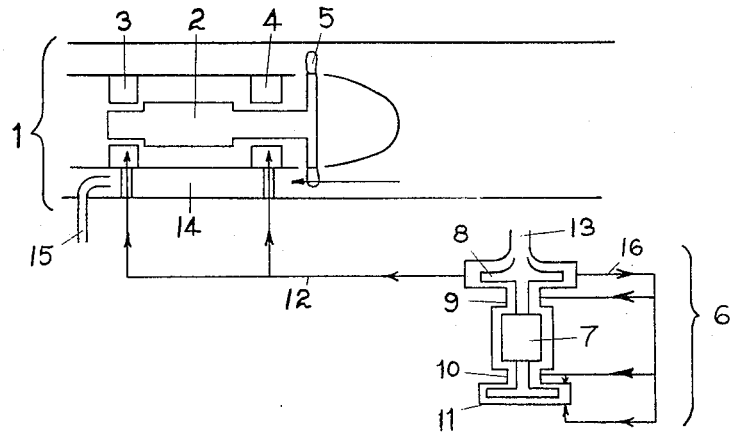
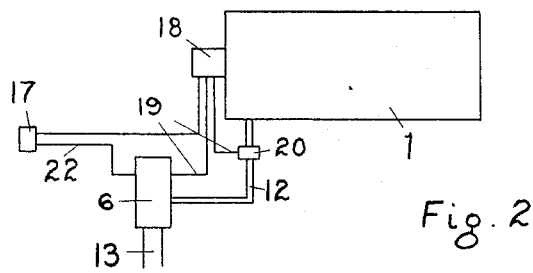
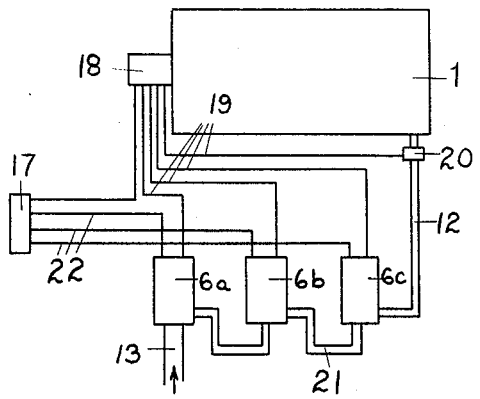

3,281,115
GAS-LUBRICATED BEARINGS
Jean Charles Chaboseau, Boissy-St. Leger, France, assignor to Aktiengesellschaft Brown, Boveri & Cie, a joint-stock company, Baden, Switzerland
Filed June 8, 1964, Ser. No. 373,372
Claims priority, application France, June 10, 1963, 937,548
8 Claims. (Cl. 253—39)

The present invention relates to bearings for rotary machines, particularly high-speed turbo-machines, the supporting bearings for such machines being fed with a gaseous medium which serves as the lubricant as distinguished from the more conventional lubricants such as oil. These bearings are known generally as "gas bearings" and the gaseous medium which is used to feed them can be the same medium which is delivered by the turbo-machine if its properties so permit.

The use of gas bearings is somewhat limited, primarily by the admissible loading capacity of these bearings, which depends on the pressure of the medium. On the other hand, opportunity and the difficulty in starting up the turbo-machine with a gaseous medium whose pressure is too low to form an adequate supporting lubricating film also limit the field of use of bearings of this type.

The present invention has for its purpose to provide an improved arrangement for supplying the gas bearings of a main machine such as a turbo-machine which thereby permits one to extend the above-mentioned limitations of the applicability of gas bearings. In particular, the object of the invention is achieved by providing at least one auxiliary unit for the main machine, this auxiliary unit comprising a motor driven compressor which itself is equipped with gas bearings and which is capable of starting without supplying a gaseous lubricating medium to its bearings from the outside, and which feeds the gas bearings of at least one main operating unit constituted by a rotary machine such as a turbo-machine with a gaseous medium which has an overpressure as compared with that of the surrounding atmosphere.

The foregoing as well as other objects and advantages inherent in the invention will become more apparent from the following description of certain embodiments thereof and which are illustrated by the acompanying drawings.

In these drawings:

FIG. 1 is a schematic view of a plant wherein a main, turbo-machine has its bearings supplied with a lubricating gaseous medium from an auxiliary, motor-compressor unit;

FIG. 2 is also a schematic view showing an additional component for the FIG. 1 plant by which the auxiliary, motor-compressor unit is disconnected after the main machine has been put into operation; and FIG. 3 is likewise a schematic view similar to FIG. 1 but wherein the main machine is supplied with a bearing lubricating gaseous medium from a plurality of auxiliary motor-compressor units.

With reference now to FIG. 1, the main rotary unit is illustrated as a turbo-machine 1 having a rotor 2 and a bladed runner 5 supported by gas lubricated bearings 3 and 4 located at opposite ends of the rotor. An auxiliary unit 6 is provided which comprises essentially a motor 7 and compressor 8 driven by such motor, the motor rotor and compressor rotor being mounted on a common, upright shaft which is journalled in radial gas bearings 9, 10 and thrust gas bearing 11. The gas compressed in the compressor unit 8 is delivered to the gas bearings 3, 4 via line 12 and serves as the lubricating medium for those bearings.

The inlet 13 to compressor 8 usually takes in air from the atmosphere but it can also take in another kind of gas, or can receive the gaseous medium to be delivered on the pressure side 14 of the turbo-machine 1, for example, by means of a Pitot tube, or in any other manner if the main unit is a compressor, and delivers a gas that can serve as the lubricating medium for the bearings.

The auxiliary unit 6 is so constructed as to enable it to start up without a gas supply to its bearings. From the moment of the start, compressor 8 delivers the sucked-in gaseous medium into the line 12. Only with increasing speed of the compressor and a corresponding feed pressure is this medium capable of lifting the shaft journals of the rotor 2 of the main unit, thus permitting the latter to start. It is thus necessary to wait until the gaseous medium has reached a sufficient over-pressure, compared to the surrounding atmosphere, before the rotor 2 of the main unit is started, which can be done manually, or automatically in dependence upon the feed pressure of compressor 8. The gas bearings 3 and 4 can be supplied continuously with lubricating gas from the auxiliary unit 6 or the latter can be disconnected after the rotor of the main unit reaches a predetermined operating condition. The over-pressure in the gas lubricant increases the supporting capacity of the fed bearings as well as the rigidity of the gaseous film which has an adverse effect upon the stability of the bearings.

The selection of an auxiliary unit to supply the gaseous lubricating medium at the start of the main machine, preferably one with a vertical shaft as illustrated which can start without a gas supply to its bearings, permits the main machine to start with only the gas furnished by the auxiliary unit, i.e. without an extraneous source of gas from the outside. It is also possible to feed the bearings 9, 10 and 11 of the auxiliary unit with a part of the gaseous medium delivered by the compressor 8 through line 16, as illustrated in FIG. 1.

FIG. 2 illustrates an arrangement of the general organization as shown in FIG. 1 whereby the auxiliary unit can be disconnected automatically after the rotor of the main machine 1 has reached a predetermined operating condition such as speed if the main machine is a turbine, or feed pressure if the main machine is a compressor. Such an arrangement is feasible in the case of machines having aerodynamically lubricated gas bearings, when the speed is sufficiently high to produce a supporting gas film in the bearings. If the main unit is a compressor and equipped with aerostatically lubricated gas bearings, the auxiliary unit 6 can be disconnected when the feed pressure of the main unit is suffiicent to ensure, in the case of self-sufficiency, the over-pressure in the lubricant necessary for the supporting effect of the bearings. Disconnection of the auxiliary unit obviously increases the overall efficiency of the entire plant.

In accordance with the arrangement illustrated in FIG. 2, the auxiliary unit 6 which supplies the gas bearings of the main unit 1 is connected to and disconnected from the latter by remote control means including a device 18, for example, a speedometer which measures the speed attained by the rotor of the main unit, or a manometer which measures the pressure in the main machine if the latter is a compressor. The condition responsive device 18 is mounted on the main unit 1 and connected by way of lines 19 with the auxiliary unit 6 as well as with a shut-off element 20 in the gas line 12. As soon as the main unit 1 reaches a predetermined speed, or a predetermined feed pressure, the control device 18 will automatically disconnect the motor 7 of the auxiliary unit and, at the same time, close the shut-off valve 20 in the gas supply line 12 between the main and auxiliary machines.

It is also possible to disconnect the auxiliary unit 6 manually. The manual control can serve as the sole disconnecting device or it can be used in combination with an automatic disconnecting device. The control device 18 actuates a signal such as an optical or acoustical one, after which the auxiliary unit is disconnected with the aid of electrical switch 17 that is connected in the supply line 22 to the motor 7 of the auxiliary unit.

FIG. 3 illustrates an embodiment of the invention wherein several auxiliary units are employed in the control. Three such units, 6a, 6b and 6c the compressors of which supply the gas bearings of the main unit 1, are connected in series with each other by way of connecting lines 21 and the output from the compressor of the last auxiliary unit 6c is connected to line 12 which leads to the gas bearings of the main unit 1. As indicated in FIG. 3, the inlet to the compressor of the first auxiliary unit 6a is indicated at 13, and the gas is passed through the compressor elements of the two other auxiliary units 6b, 6c in series. Alternatively, the compressors of the several auxiliary units may be connected in parallel, or in series-parallel.

The plant illustrated in FIG. 3 also provides automatic and manual connection and disconnection as between the main machine 1 and the auxiliary units 6a to 6c, and its method of operation is similar to the embodiment of FIG. 2. When the main unit 1 has reached the predetermined operating condition, the device 18 automatically disconnects the auxiliary units 6a, 6b and 6c either in succession or simultaneously. The switch 17 permits connection and disconnection manually.

If desired, several main units 1 can be supplied from a single auxiliary unit or from several of such units. The switching devices are then correspondingly changed, without such modification being without the scope of the invention as defined in the appended claims.

I claim:

1. Apparatus for supplying the gas bearings of a main rotary machine such as a high-speed turbo-machine with a gaseous lubricating medium comprising at least one auxiliary unit having a motor and compressor driven thereby and itself having gas bearings, said auxiliary unit being capable of being started without the need for an extraneous supply of a gaseous lubricating medium to its bearings and a line connecting the output from said compressor with the gas bearings of said main rotary machine for supplying the gaseous lubricant thereto at a pressure greater than atmospheric.

2. Apparatus as defined in claim 1 and which further includes a line also connecting the output from said compressor to the gas bearings of said auxiliary unit.

3. Apparatus as defined in claim 1 wherein the motor and compressor of said auxiliary unit are mounted for rotation on a vertical axis.

4. Apparatus as defined in claim 1 and which further includes means responsive upon said main rotary machine reaching a predetermined operating condition for disconnecting the compressor of said auxiliary unit from the gas bearings of said main rotary machine.

5. Apparatus as defined in claim 1 wherein the inlet to said compressor is connected with the surrounding atmosphere.

6. Apparatus as defined in claim 1 wherein the inlet to said compressor is connected to receive gaseous medium from the pressure side internally of said main rotary machine.

7. Apparatus as defined in claim 1 and which includes a plurality of auxiliary units each as defined therein, the compressors of said units being connected together.

8. Apparatus as defined in claim 7 wherein the compressors of the auxiliary units are connected in series.

No references cited.

MARTIN P. SCHWADRON, *Primary Examiner.*

EVERETTE A. POWELL, *Assistant Examiner.*